United States Patent [19]

Yoshida

[11] 4,219,425

[45] Aug. 26, 1980

[54] FILTER PRESS

[75] Inventor: Takuji Yoshida, Osaka, Japan

[73] Assignees: NGK Insulators Ltd., Nagoya; Noritake Iron Works Co., Ltd., Osaka, both of Japan

[21] Appl. No.: 677,841

[22] Filed: Apr. 16, 1976

[30] Foreign Application Priority Data

May 27, 1975 [JP] Japan .................................. 50-64492

[51] Int. Cl.² .......................................... B01D 25/12
[52] U.S. Cl. .................................. 210/225; 210/228; 210/236
[58] Field of Search .............................. 210/224–231, 210/236

[56] References Cited

U.S. PATENT DOCUMENTS

| | | | |
|---|---|---|---|
| 1,720,211 | 7/1929 | Eddison | 210/228 X |
| 2,932,399 | 4/1960 | Emele | 210/225 |
| 3,330,414 | 7/1967 | Mecky | 210/227 |
| 3,360,130 | 12/1967 | Kaga | 210/236 X |
| 3,695,440 | 10/1972 | Mori | 210/228 X |

Primary Examiner—Robert H. Spitzer
Attorney, Agent, or Firm—Stevens, Davis, Miller & Mosher

[57] ABSTRACT

A filter press having a slurry feed inlet arranged at the lower ends of filter cloths at locations outside filter chambers formed by filter plates thereby enabling the filter cloths to entirely open when the filter plates are opened to facilitate discharge of cakes adhered to the filter cloths.

7 Claims, 4 Drawing Figures

FIG_1

FILTER PRESS

BACKGROUND OF THE INVENTION

1. Field of the Invention

The present invention relates to a filter press, and more particularly to a filter press adapted to be able to discharge cakes from filter cloths with ease after squeezing.

2. Description of the Prior Art

It is well known in the prior art filter presses that a slurry feed inlet is provided passing through filter chambers and the peripheries of openings of pairs of two filter cloths corresponding to the feed inlet are fixed to filter plates at the circumferences of the feed inlet. With such an arrangement, when the filter plates are opened after squeezing, the upper portions of the filter cloths open in the form of an inverted V-shape owing to binding of the upper portions to facilitate discharging cakes adhered to the upper halves of the filter cloths. However, since the peripheries of the openings of the filter cloths are fixed to the filter plates at the circumferences of the feed inlet, the lower portions of the filter cloths cannot move away from each other but remain still in parallel with the filter plates, so that it is difficult to discharge the cakes adhered to the lower halves of the filter cloths.

SUMMARY OF THE INVENTION

The object of the present invention is to provide an improved filter press in which filter cloths are adapted to open into a completely inverted V-shape to facilitate the discharging of the cakes from the entire filter cloths after squeezing.

In order that the invention may be more clearly understood, a preferred embodiment will now be described, by way of example, with reference to the accompanying drawings.

BRIEF DESCRIPTION OF THE DRAWINGS

In the drawings, which illustrate the exemplary embodiment of the invention.

DETAILED DESCRIPTION OF THE PREFERRED EMBODIMENT

Figure 4:
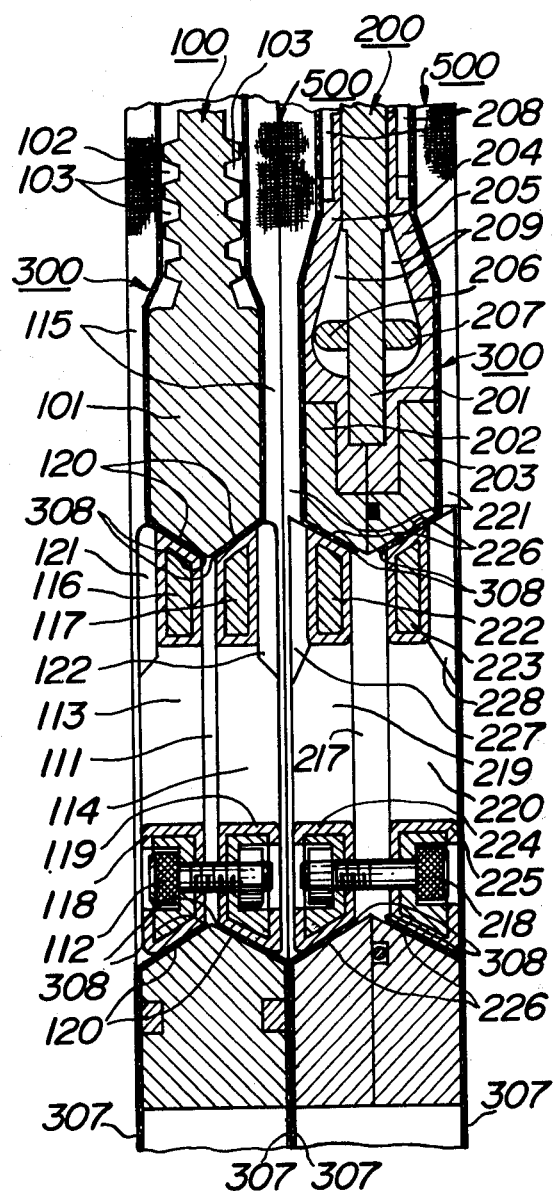
FIG. 4 is a sectional view of the filter press taken along the line IV—IV in FIG. 3.

Referring to the drawings, the filter press according to the invention will be explained in detail hereinafter. For the sake of clarity, the left side as viewed in FIGS. 1, 2 and 4 is referred to as "front", and the right side as "rear" in the following description.

Figure 1:
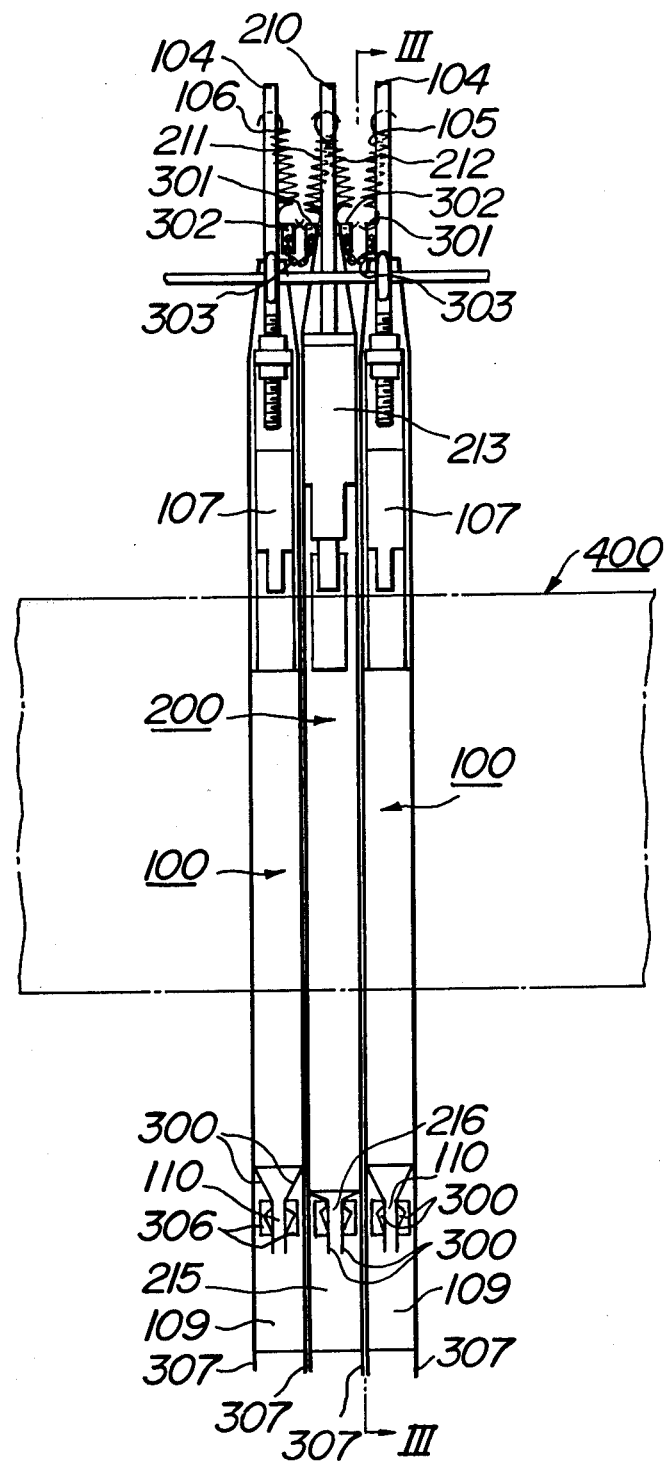
FIG. 1 is a side elevation showing a main part of the filter press according to the invention, of which filter plates are in closed position.
Figure 2:
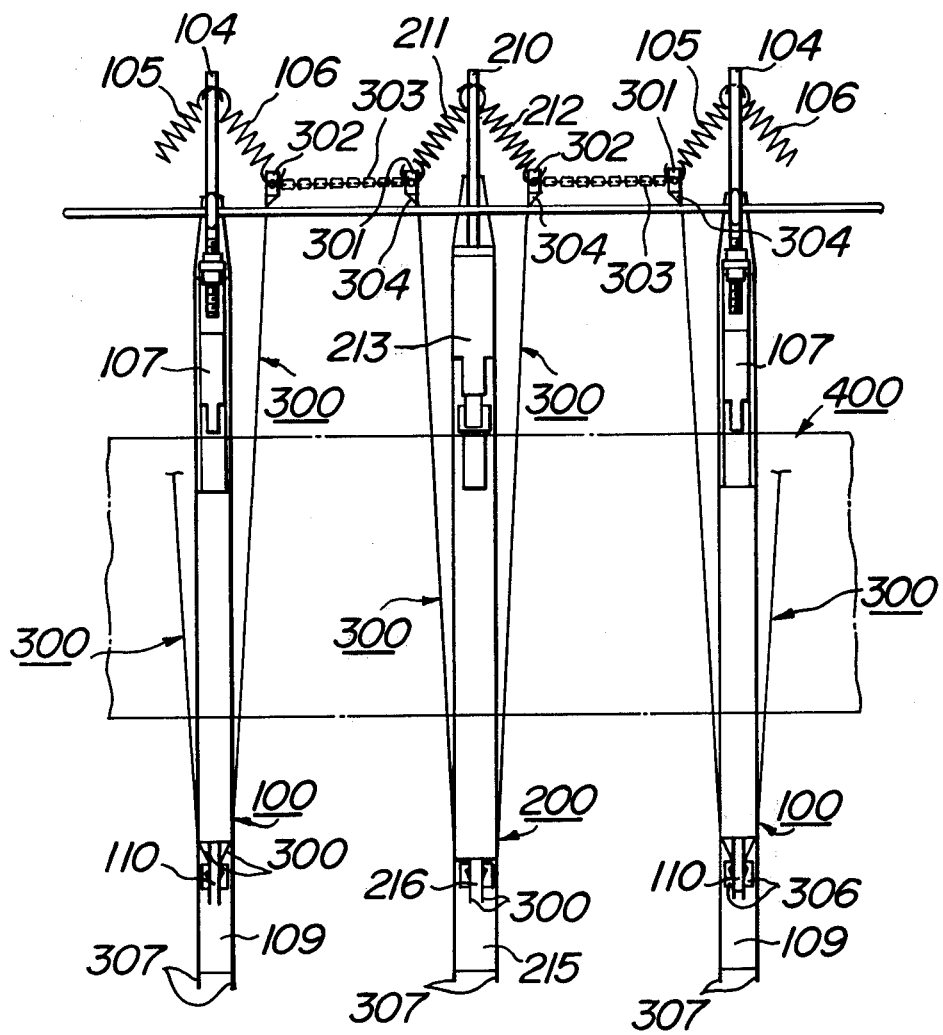
FIG. 2 is a side elevation of filter press shown in FIG. 1 in opened position.
Figure 3:
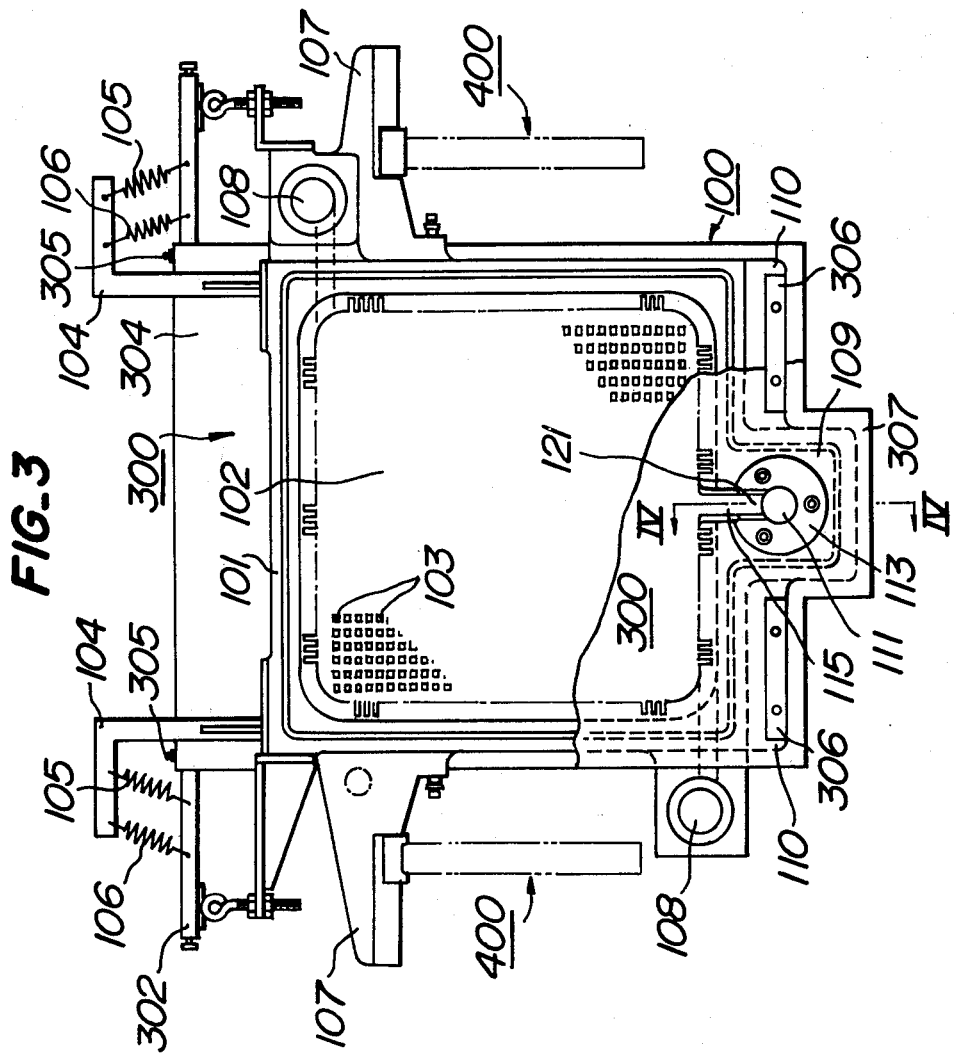
FIG. 3 is a sectional view of the filter press taken along the line III—III in FIG. 1.

The filter press according to the invention comprises a plurality of filter plates 100 and 200 arranged alternately, and filter cloths of which each pair of two cloths is arranged between the adjacent filter plates 100 and 200 as shown in FIGS. 1 and 2. Referring to FIGS. 3 and 4, the filter plate 100 mainly comprises peripheral ridges 101 along the peripheries on opposite sides for embracing the cloths 300 between the adjacent filter plates, and concave filtrate flowing portions 102 surrounded by the peripheral ridges 101 on opposite sides and sunk relative to the ridges for flowing the filtrate, the concave portions 102 being formed with a number of grooves 103 for effectively flowing the filtrate. The filter plate 200 as shown in FIG. 4 mainly comprises a central plate 201, a pair of frame members 202, 203 embracing the peripheries of the central plate 201 on front and rear sides, and a pair of diaphragms 204, 205, on front and rear sides of the central plate 201, the peripheries of which are held embraced between the central plate 201 and frame members 202, 203. A pair of insertion members 206, 207 are arranged between the central plate 201 and the diaphragms 204 and 205, respectively, to expand the inward portions of the diaphragms 204, 205 in front and rear directions held between the frame members 202, 203 and the central plate 201. The diaphragms 204, 205 are also provided with filtrate flowing portions 208 corresponding to the filtrate flowing portions 102 of the filter plate 100. An introduction of pressurized fluid such as water under pressure into a pressure chamber 209 between the central plate 201 and the diaphragms 204, 205 causes the diaphragms to expand outwardly to squeeze filter cakes after filtration.

Referring to FIGS. 1, 2 and 3, each of the filter plates 100 and 200 is provided at its upper end on both sides as viewed in FIG. 3 with L-shaped arms 104 or 210 of which bottom legs extend away from each other. Each of the L-shaped arms 104, 210 is provided with springs 105, 106 and 211, 212.

The filter plates 100 (200) are hung on brackets 107 (213) supported by side plates 400 of the filter press and are provided at the lower left and upper right corners with outlets 108 for draining the filtrate which communicate with the grooves 103 of the filter plate 100. Each pair of filter cloth hanging rods 301, 302 are arranged one in symmetry on each side of the filter plate 100 or 200. The filter cloth hanging rod 301 on the front side of the filter plate is hung at its ends by the springs 105 (211) of which upper ends are secured to the L-shaped arms. Similarly, the filter cloth hanging rod 302 on the rear side of the filter plate is hung at its ends by the springs 106 (212). The adjacent cloth hanging rods 302 and 301 are connected to each other by means of connecting means such as chains 303, so that when the filter plates 100 and 200 move away from each other, the hanging rods 302 and 301 are pulled upwardly by equal forces.

The filter plate 100 (200) is provided at its lower central portion with a depending lug 109 (215) formed with a feed inlet 111 (217) passing through the filter plate. The filter plate 100 (200) is further provided on both sides of the depending lug 109 with filter cloth securing lugs 110 (216).

The filter cloth 300 is preferably somewhat larger than the filter plates 100, 200. The upper end 304 of the filter cloth is folded and sewed to form a loop for inserting or accommodating the cloth hanging rod 301 (302) (FIGS. 2 and 3). The filter cloth is fixed to the inserted cloth hanging rod by means of pins 305 which pass through holes (not shown) formed in the folded upper end 304 of the filter cloth (FIG. 3). The filter cloth 300 is formed at its lower central portion with a lug 307 and is anchored at the lower portion with exception of the central lug 307 to the filter cloth securing lugs 110 (216) of the filter plate by means of fitting plates 306. The lug 307 of the filter cloth 300 is formed with an opening 308 (FIG. 4), the periphery of which is clamped to the circumference of a feed inlet 111 (217) of the filter plate by means of filter cloth clamping means, such for example as a pair of front and rear filter cloth clamping annular bodies 113 and 114 (219 and 220) adapted to be inserted into the feed inlet 111 (217) on either side and connected to each other by bolts and nuts 112 (218) (FIG. 4). A pair of the filter plates 100 and 200 form therebetween a filter chamber 500 which communicates with the feed inlet 111 (217) through a slurry passing channel 115 (221). The front and rear annular bodies 113, 114 (219, 220) comprise metal annuluses 116, 117 (222, 223) and elastomeric covers 118, 119 (224, 225) preferably made of rubber or synthetic resin entirely covering the annuluses. The front and rear annular bodies 113, 114 (219, 220) have outer peripheral walls which are tapered to mate with the inner walls 120 (226) of the feed inlet 111 (217) which serve to secure the filter cloth to the filter plate 100 (200) in water tight manner. The annular bodies 113, 114 (219, 220) are formed with channels 121, 122 (227, 228) at locations corresponding to the slurry passing channel 115 (221) to communicate it with the feed inlet 111 (217).

The operation of the filter press according to the invention will be explained hereinafter.

The slurry supplied to the filter press of which filter plates 100 and 200 and filter cloth 300 are in the closed position is introduced into the filter chambers 500 through the feed inlet 111 (217) and communicating channels 121, 122 (227, 228) and 115 (221) and is filtered when it passes through the filter cloths 300. The filtrate flows down through the filtrate flowing portions 102 and 208 and then drained through the outlets 108. After the filtration has been completed, the introduction of the slurry is stopped and thereafter fluid such as water under pressure is forced into the pressure chamber 209 between the central plates 201 and diaphragms 204, 205 to expand them toward the filtrate flowing portions 102 of the filter plate 100 such that cakes adhered to the filter cloth 300 are squeezed to further reduce the water content of the cakes. When the filter plates 100 and 200 are opened, the overall filter cloths 300 consequently open into the form of an inverted V-shape owing to the arrangement according to the invention so that the cloths assume their tilted position which is preferable for discharge of the cakes. At the same time, vibration caused in the filter plates 100 and 200 is transmitted to the filter cloths 300 through the springs 105, 106 and 211, 212. The opening of the cloths into the inverted V-shape ensures the complete discharge of the cakes from the cloths in conjunction with the transmission of the vibration from the filter plates to filter cloths.

As can be seen from the above detailed explanation, the filter press according to the invention comprises the filter cloths secured to the lower ends of the filter frames out of the filtering portions thereof to entirely open the filter cloths when the filter plates are opened to facilitate the discharge or fall of the cakes.

Although there have been shown and described specific structures, it is to be clearly understood that the same were merely for the purpose of illustration, and that changes and modifications may readily be made therein by those skilled in the art without departing from the spirit and scope of the invention.

What is claimed is:

1. A filter press comprising a plurality of filter plates forming filter chambers therebetween when they are in close contact with each other, said filter plates being provided with a feed inlet at their lower ends outside of said filter chambers and formed with grooves for communicating the feed inlet with said filter chambers, and a pair of two filter cloths arranged between each two adjacent filter plates, said filter cloths covering the filter chamber portions of each filter plate and covering said communicating grooves, and said two filter cloths connected at upper portions thereof and secured at peripheries of openings provided in their lower portions to the adjacent filter plates at the circumference of said feed inlet, whereby when the filter plates are opened the entire filtering surfaces of the cloths are able to separate from the filter plates thereby facilitating discharge of filter cakes adhered to said filter cloths.

2. A filter press according to claim 1, wherein the filter cloths are hung from arms provided on the uppper portions of said filter plates.

3. A filter press according to claim 2, wherein the filter cloths are hung through springs from the arms.

4. A filter press according to claim 1, wherein each pair of filter cloths are connected to one another at the upper portions by chains.

5. A filter press according to claim 1, wherein the periphery of the opening provided in the lower portion of each said filter cloth is clamped between inner walls of the feed inlet of the filter plate and filter cloth clamp means are fitted within said feed inlet.

6. A filter press according to claim 5, wherein said filter cloth clamp means is a pair of front and rear filter cloth clamping annular bodies.

7. A filter press according to claim 1 wherein alternate ones of said filter plates comprise diaphragm means for pressing outwardly from the filter chamber portions of the plate of which said means are a part, for squeezing filter cakes formed between the two filter cloths between each two adjacent filter plates.

* * * * *